United States Patent
Wang et al.

(10) Patent No.: US 11,954,487 B2
(45) Date of Patent: Apr. 9, 2024

(54) TECHNIQUES, DEVICES, AND INSTRUCTION SET ARCHITECTURE FOR EFFICIENT MODULAR DIVISION AND INVERSION

(71) Applicant: NVIDIA Corporation, Santa Clara, CA (US)

(72) Inventors: Shuai Wang, Shanghai (CN); Chen Yao, Shanghai (CN); Xiao Wu, Shanghai (CN); Rongzhe Zhu, Shanghai (CN); Yuji Qian, Shanghai (CN); Xixi Xie, Jiangsu (CN)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 17/707,176

(22) Filed: Mar. 29, 2022

(65) Prior Publication Data
US 2023/0244482 A1 Aug. 3, 2023

Related U.S. Application Data

(63) Continuation of application No. PCT/CN2022/074567, filed on Jan. 28, 2022.

(51) Int. Cl.
*G06F 9/30* (2018.01)
*G06F 7/499* (2006.01)
*G06F 7/72* (2006.01)

(52) U.S. Cl.
CPC ........ *G06F 9/3001* (2013.01); *G06F 7/49942* (2013.01); *G06F 7/727* (2013.01); *G06F 9/30032* (2013.01)

(58) Field of Classification Search
CPC .... G06F 9/3001; G06F 9/30032; G06F 7/727; G06F 7/49942
See application file for complete search history.

(56) References Cited

U.S. PATENT DOCUMENTS

| | | | |
|---|---|---|---|
| 5,751,620 A | 5/1998 | Monier | |
| 5,982,900 A | 11/1999 | Ebihara et al. | |
| 6,008,703 A * | 12/1999 | Perrott | H03C 3/0925 331/23 |
| 6,085,210 A | 7/2000 | Buer | |
| 6,088,453 A * | 7/2000 | Shimbo | G06F 7/721 713/100 |
| 6,298,442 B1 | 10/2001 | Kocher et al. | |
| 6,748,410 B1 | 6/2004 | Gressel et al. | |

(Continued)

FOREIGN PATENT DOCUMENTS

| | | |
|---|---|---|
| CN | 1691580 A | 11/2005 |
| CN | 1985458 A | 6/2007 |

(Continued)

OTHER PUBLICATIONS

Joye et al., "The Montgomery Power Ladder", LCIS, Dept. of Computer Science and Information Engineering, 2003, pp. 291-302.

(Continued)

*Primary Examiner* — Jacob Petranek
(74) *Attorney, Agent, or Firm* — Lowenstein Sandler LLP

(57) ABSTRACT

Disclosed are apparatuses, systems, and techniques to perform and facilitate fast and efficient modular computational operations, such as modular division and modular inversion, using shared platforms, including hardware accelerator engines.

20 Claims, 9 Drawing Sheets

(56) References Cited

U.S. PATENT DOCUMENTS

| | | |
|---|---|---|
| 7,027,597 B1 | 4/2006 | Stojancic et al. |
| 7,966,361 B1* | 6/2011 | Moni ..................... G06F 7/72 708/491 |
| 9,851,905 B1 | 12/2017 | Ramalingam et al. |
| 2002/0039418 A1 | 4/2002 | Dror et al. |
| 2006/0140399 A1 | 6/2006 | Young |
| 2006/0285682 A1 | 12/2006 | Sarangarajan et al. |
| 2008/0049931 A1 | 2/2008 | Vasyltsov |
| 2009/0113252 A1 | 4/2009 | Lambert et al. |
| 2010/0177887 A1 | 7/2010 | Ciet et al. |
| 2013/0114806 A1 | 5/2013 | Bertoni et al. |
| 2013/0311532 A1* | 11/2013 | Olsen ..................... G06F 7/483 708/491 |
| 2014/0281573 A1 | 9/2014 | Jaffe |
| 2017/0060535 A1 | 3/2017 | Teglia |
| 2017/0061119 A1 | 3/2017 | Teglia |
| 2017/0257211 A1 | 9/2017 | Vigilant |
| 2018/0211065 A1 | 7/2018 | Jaffe |
| 2019/0036678 A1 | 1/2019 | Ahmed |
| 2019/0089523 A1 | 3/2019 | Adjedj |
| 2019/0227736 A1 | 7/2019 | Hong et al. |
| 2019/0354498 A1 | 11/2019 | Ebsen et al. |
| 2020/0344056 A1 | 10/2020 | Guilley et al. |
| 2021/0083840 A1 | 3/2021 | Tunstall |
| 2021/0243006 A1 | 8/2021 | Meyer |
| 2022/0075879 A1 | 3/2022 | Hamburg et al. |
| 2022/0085998 A1 | 3/2022 | Xiao et al. |
| 2022/0085999 A1 | 3/2022 | Hamburg et al. |
| 2023/0195418 A1* | 6/2023 | Kondru ................... G06F 7/727 708/200 |

FOREIGN PATENT DOCUMENTS

| | | |
|---|---|---|
| CN | 102207847 A | 10/2011 |
| CN | 108111309 A | 6/2018 |
| CN | 108228137 A | 6/2018 |
| CN | 108833120 A | 11/2018 |
| CN | 111712816 A | 9/2020 |
| TW | 201437910 A | 10/2014 |
| WO | 2005048008 A2 | 5/2005 |
| WO | 2021211678 A1 | 10/2021 |

OTHER PUBLICATIONS

International Search Report and Written Opinion for International Application No. PCT/CN2022/074567, dated Sep. 28, 2022, 6 Pages.

International Search Report and Written Opinion for International Application No. PCT/CN2022/074568, dated Oct. 26, 2022, 8 Pages.

International Search Report and Written Opinion for International Application No. PCT/CN2022/074569, dated May 30, 2022, 9 Pages.

International Search Report and Written Opinion for International Application No. PCT/CN2022/074570, dated Oct. 26, 2022, 7 Pages.

* cited by examiner

TECHNIQUES, DEVICES, AND INSTRUCTION SET ARCHITECTURE FOR EFFICIENT MODULAR DIVISION AND INVERSION

RELATED APPLICATIONS

The application claims the benefit of priority under 35 U.S.C. 365 to the international application PCT/CN2022/074567, filed Jan. 28, 2022 with the China National Intellectual Property Administration, which is hereby incorporated in its entirety.

TECHNICAL FIELD

At least one embodiment pertains to technologies used to perform and facilitate modular computational operations. For example, at least one embodiment pertains to speeding-up operations utilized in the context of public-private key cryptography, elliptic curve cryptography, and the like. Disclosed are computational techniques, hardware accelerator devices, and an instruction set architecture for fast and efficient performance, on shared platforms, of modular division and modular inversion.

BACKGROUND

In public-key cryptography systems, a computing device may perform operations on large binary numbers as part of various algorithms, such as Rivest-Shamir-Adelman (RSA), Diffie-Hellman (DH), elliptic curve cryptography (ECC) algorithms, etc., to encrypt and/or decrypt secret messages, digital signature algorithms (DSA) to authenticate messages, and so on. Cryptographic algorithms typically involve modular arithmetic operations, in which integers are wrapped around a circle of length M (the ring $Z_M$), so that any two numbers that differ by M (or any other integer of M) are treated as the same number. A typical multiplication operation of two numbers, A and B, can generate a number AB that is much larger than M Reducing the generated number to the ring $Z_M$ amounts to determining a residue of division of AB by M and can be a computationally expensive operation. Performance of even a single instance of a cryptographic algorithm can involve a large number of these or other (e.g., addition, subtraction, exponentiation, division, etc.) modular operations. Furthermore, typical applications can include a large number of instances of encryption and decryption of large amounts of data that can consume significant processing resources.

DETAILED DESCRIPTION

Figure 1:
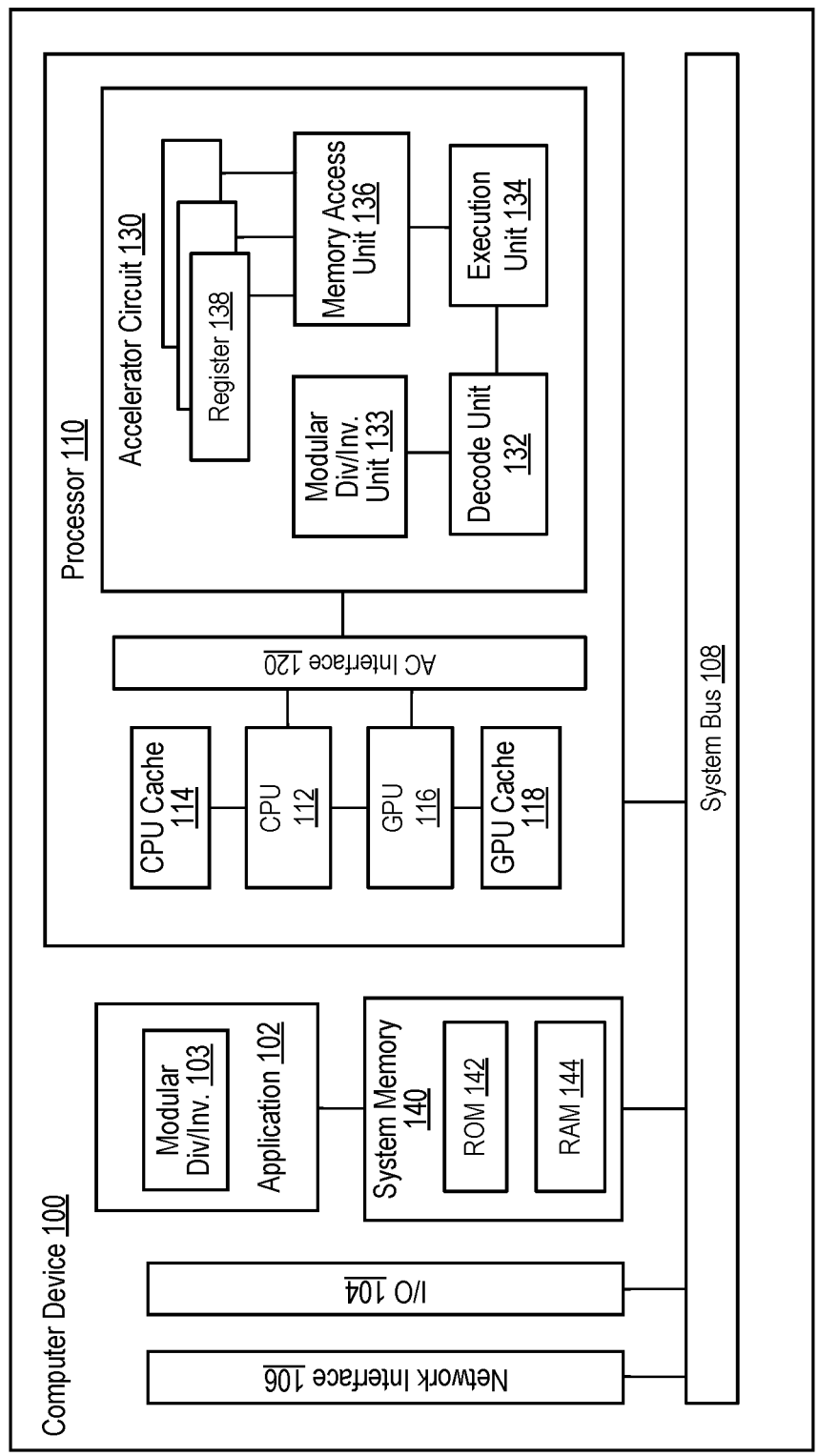
FIG. 1 is a block diagram of an example computer device that performs efficient modular division and inversion, in accordance with at least some embodiments.

Cryptographic applications often deploy asymmetric public/private key algorithms, e.g., DH, RSA, DSA algorithms. For example, a cryptographic application may generate a private/public keys by selecting a pair of large prime numbers, e.g., p and q, selecting a public (encryption) exponent e and then computing a secret (decryption) exponent d that is based on the public (encryption) exponent e and the selected numbers p and q. The numbers e and M=p q may subsequently be revealed to other actors as part of the public key while p, q, and d are stored (as the secret private key) by the recipient of future secret communications. A sender may encrypt a plaintext message m by computing a ciphertext message c using modular exponentiation, $c=m^e$ mod M, and communicate c (e.g., publicly) to the recipient. The recipient may then decrypt the ciphertext by applying another modular exponentiation, $m=c^d$ mod M. The original plaintext message is recovered provided that the value of the decryption exponent d is selected in such a way that e·d=1 modulo a suitably chosen number, e.g., (p−1)·(q−1).

Public/private key cryptography is a staple component of modern computer software and hardware systems, used in a multitude of applications, including confidential communications, time-stamping, non-repudiation protocols, cryptocurrency, and so on. In some systems, a cryptographic application may be instantiated during system boot and used for all secure data communications (e.g., between a processor and a system memory). RSA and ECC are among the algorithms used in most popular cryptographic applications. In ECC applications, numbers are associated with points on elliptic curves (e.g., Weierstrass curves) with special rules defined for various arithmetic operations, e.g., addition, subtraction, doubling, multiplication, etc. The nature of the elliptic curves ensures that a product of two large numbers AB=C on an elliptic curve can be practically anywhere on the curve so that recovering an unknown number A from known numbers B and C may be a prohibitively difficult computational task. ECC computations often involve multiple modular divisions, e.g., operations A/B=C mod M, which amount to finding such a number C whose modular multiplication by B yields A: AC=B mod M. The modular division is often performed using an extended binary algorithm that is based on the Euclidean greatest common denominator (GCD) method. The extended binary GCD algorithm reduced the modular division to a number of conditional addition, subtraction, bit-shifting, etc., operations with the computational bottleneck being the need to compute a modular division by four, U/4 mod M, of appropriately chosen number U.

RSA applications, on the other hand, involve a large number of modular multiplications, which are standard multiplication followed by a modular reduction. To reduce the computational costs of modular reductions, computing algorithms often deploy the Montgomery reduction technique. More specifically, to compute AB mod M, the numbers A and B may first be transformed to the Montgomery domain, A mod M→$\bar{A}$=A·$2^n$ mod M, B mod M→$\bar{B}$=B·$2^n$ mod M, where $2^n$ is an auxiliary modulus (Montgomery radix). Because of the presence of the extra factor $2^n$ in the product $\bar{A}\cdot\bar{B}$=(A·B·$2^n$) $2^n$ mod M, the number $\bar{A}\cdot\bar{B}$ is not equal to the Montgomery representation $\bar{C}$ of the product C=A·B, as an extra division by $2^n$ needs to be performed: $\bar{C}$= $\bar{A}\cdot\bar{B}\cdot2^{-n}$ mod M. To efficiently compute $\bar{A}\cdot\bar{B}\cdot2^{-n}$ mod M, a number S=−$M^{-1}$ mod $2^n$ is also selected; in other words, M·S+1=k·$2^n$ with some integer k. By construction, it then follows that the number M($\bar{A}\cdot\bar{B}$·S mod $2^n$) may be added to the product $\bar{A}\cdot\bar{B}$ without changing its value modulo M:

$$\bar{A}\cdot\bar{B} \bmod M = [\bar{A}\cdot\bar{B}+M(\bar{A}\cdot\bar{B}\cdot S \bmod 2^n)] \bmod M.$$

Furthermore, the presence of M($\bar{A}\cdot\bar{B}$·S mod $2^n$) makes the number $\bar{A}\cdot\bar{B}$+M($\bar{A}\cdot\bar{B}$·S mod $2^n$) a multiple of $2^n$, since $$[\bar{A}\cdot\bar{B}+M(\bar{A}\cdot\bar{B}\cdot S \bmod 2^n)] \bmod 2^n = [\bar{A}\cdot\bar{B}\cdot(1+M\cdot S)] \bmod 2^n = 0 \bmod 2^n.$$

Division of $\bar{A}\cdot\bar{B}$+M(A·B·S mod $2^n$) by $2^n$ is easily performed by right-shifting by n bits. with the result yielding the Montgomery representation $\bar{C}$ of the product C=A·B mod M. (If the result exceeds M, $\bar{C}$ is obtained by one additional subtraction of M). In the Montgomery representation, any number of consecutive modular multiplications may be performed directly in the Montgomery domain (with only a final output $\bar{O}$ transferred back from the Montgomery domain to the standard domain, $\bar{O}$→O).

Even though the value S may be precomputed once and stored in the memory of the computing device, such storage may consume a lot of memory resources. For example, a single value S may be as long as 2048 bits, 4096 bits, or even more, and there may be a large number of values that need to be stored (e.g., if the computing device is using multiple public/private key pairs).

Aspects and embodiments of the present disclosure address technological challenges by providing concurrent computational support for cryptographic applications that deploy modular division (e.g., ECC algorithms) and applications that deploy modular inversion (e.g., RSA algorithms). The embodiments described below illustrate devices, techniques, and an instruction set architecture for performing both types of computations (e.g., U/4 mod M as well as S=$M^{-1}$ mod $2^n$) on equal footing, e.g., a single accelerator engine. The same (or similar) operations and accelerator engines may be utilized to efficiently facilitate, in one set of instances, the modular division and, in another set of instances, the modular inversion. As described in more detail below, the optimization is achieved by deploying a number of techniques. For example, a set of multiples of M may be computed and stored as computational operands, M, 2M, 3M, in different high-speed registers. In both instances of modular division and modular inversion, the operands may be selected based on a subset of bits, e.g., two least significant bits, of operands M and 3M as well as on the subset of bits of an additional number; this additional number may be the dividend U, in the instances of modular division, and a certain auxiliary number in the instances of modular inversion.

The advantages of the disclosed devices and techniques include, but are not limited to, a fast and efficient computation of modular operations at run-time. Because the same accelerator circuits may be used for both types of modular operations, the disclosed devices and techniques provide support for cryptographic applications of different types. For example, the disclosed devices and techniques may switch on the fly from performing RSA computations to performing ECC computations, and vice versa. Additionally, since the disclosed techniques of computing modular inverses represent a substantial improvement on the existing techniques, the need to precompute and store modular inverses $M^{-1}$ mod $2^n$ for Montgomery multiplication may be eliminated to save significant memory resources, improve overall computational efficiency, reduce the cost and size of the computing devices, and the like.

System Architecture

FIG. 1 is a block diagram of an example computer device 100 that performs efficient modular division and inversion, in accordance with at least some embodiments. Example computer device 100 depicted in FIG. 1 may be a desktop computer, a tablet, a smartphone, a server (local or remote), a thin/lean client, a cloud computing node, a card reader, a wireless sensor node, an Internet-of-Things (IoT) node, an embedded system dedicated to one or more specific applications, and so on. One or more applications 102 may be executed on computer device 100.

Application(s) 102 supported by computer device 100 may include machine-learning application(s), graphics application(s), computational application(s), cryptographic application(s) (such as authentication, encryption, decryption, secure storage application(s), etc.), embedded application(s), external application(s), or any other types of application(s) that may be executed by computer device 100. Application(s) 102 may be instantiated on the same computer device 100, e.g., by an operating system executed by computer device 100. Alternatively, application(s) 102 may be external application(s) instantiated by a guest operating system supported by a virtual machine monitor (hypervisor) operating on the computer device 100. In some embodiments, the external application(s) may reside on a remote access client device or a remote server (not shown), with the computer device 100 providing cryptographic support for the client device and/or the remote server.

The computer device 100 may include one or more processors 110. "Processor" refers to any device capable of executing instructions encoding arithmetic, logical, or I/O operations. In one illustrative example, a processor may follow Von Neumann architectural model. Processor 110 may include a central processing unit (CPU) 112, which may have any number of arithmetic logic units (ALUs), floating-point units (FPUs), control units, registers, and so on. CPU 112 may be executing at least some operations of application(s) 102. CPU 112 may include one or more cores having access to a single or multi-level cache 114. In some embodiments, each core may execute instructions to run a number of threads, also known as logical cores. Various logical cores may be assigned to one or more application(s) 102, although more than one logical core may be assigned to a specific application 102 for parallel processing. A multi-core CPU 112 may simultaneously execute multiple instructions. A single-core CPU 112 may typically execute one instruction at a time (or process a single pipeline of instructions). CPU 112 may be implemented as a single integrated circuit, two or more integrated circuits, or may be a component of a multi-chip module.

In some embodiments, some operations of application(s) 102 may be executed by one or more graphics processing units (GPUs) 116. GPU 116 may include multiple cores, each core being capable of executing multiple threads. Each core may run multiple threads concurrently (e.g., in parallel). In some embodiments, GPU threads may have access to thread-specific (private) GPU registers. Additionally, one or more shared GPU registers may be accessed by all threads of the GPU core. In at least one embodiment, each GPU core may include a scheduler to distribute computational tasks and processes among different GPU threads. GPU 116 may also have a dispatch unit to implement scheduled tasks on appropriate GPU threads using correct private and shared GPU registers. In some embodiments, GPU 116 may have a cache 118, access to which may be shared by multiple GPU cores. In some embodiments, CPU 112 may execute processes that involve serial computational tasks whereas GPU 116 may execute tasks that are amenable to parallel processing. In some embodiments, application(s) 102 may determine which processes are to be executed on GPU 116 and which processes are to be executed on CPU 112. In other embodiments, CPU 112 may determine which processes are to be executed on GPU 116 and which processes are to be executed on CPU 112. In some embodiments, processor 110 may include one or more application-specific integrated circuits (ASICs), field-programmable gate arrays (FPGAs), finite state machines (FSMs), and the like.

Processor 110 may have access, e.g., over a system bus 108, to one or more system memory 140 devices. System memory 140 may refer to any volatile or non-volatile memory and may include a read-only memory (ROM) 142, a random-access memory (RAM) 144, as well as (not shown) electrically erasable programmable read-only memory (EEPROM), flash memory, flip-flop memory, or any other device capable of storing data. RAM 144 may be a dynamic random-access memory (DRAM), synchronous DRAM (SDRAM), a static memory, such as static random-access memory (SRAM), and the like. In some implementations, processor 110 and the system memory 140 may be implemented as a single controller, e.g., as an FPGA.)

Processor 110 may include an accelerator circuit (accelerator co-processor, accelerator engine) 130. One or more application(s) 102 may perform cryptographic operations on processor 110 with one or more functions, e.g., modular division/inversion functions 103, performed by accelerator circuit 130. Accelerator circuit 130 may include accelerator function units, e.g., modular division/inversion unit 133 to implement computations of modular division/inversion functions 103 of application(s) 102, as described in more detail below. Accelerator circuit 130 may be communicatively coupled to CPU 112 and/or GPU 116 via accelerator circuit interface (AC interface) 120. In some embodiments, accelerator circuit 130 may perform a portion of cryptographic computations executed by processor 110. For example, CPU 112 (and/or GPU 116) may be executing an RSA algorithm while performing a number of Montgomery multiplications and reductions. In the course of performing a Montgomery reduction for a specific number M, CPU 112 (and/or GPU 116) may provide a value of the number M to accelerator circuit 130, and accelerator circuit 130 may compute $M^{-1} \mod 2^n$ (or $-M^{-1} \mod 2^n$) and return the computed value to CPU 112 (and/or GPU 116). In another example, CPU 112 (and/or GPU 116) may be executing an ECC algorithm while performing a number of modular divisions. In the course of performing a modular division, $U/4 \mod M$, for a specific modulus M, CPU 112 (and/or GPU 116) may provide a value of the dividend U and a value of the modulus M to accelerator circuit 130, and accelerator circuit 130 may compute $U/4 \mod M$ and return the computed value to CPU 112 (and/or GPU 116).

Accelerator circuit 130 may include a decode unit 132 (also known as a decoder), which may be coupled to an instruction fetch unit (not depicted in FIG. 1). Decode unit 132 may decode instructions, and generate one or more micro-operations, micro-code entry points, microinstructions, other instructions, or other control signals, which are decoded from, or which otherwise reflect, or are derived from, the original instructions. Decode unit 132 may be implemented using various mechanisms, e.g., look-up tables, hardware implementations, programmable logic arrays (PLAs), microcode read only memories (ROMs), and the like.

(Decode unit 132 may be coupled to an execution unit 134, which may include a scheduler unit (not depicted in FIG. 1). Decode unit 132 and execution unit 134 may be coupled to one or more registers 138 via a memory access unit 136. Each register 138 may store one or more different data types, such as scalar integer, scalar floating point, packed integer, packed floating point, vector integer, vector floating point, etc., status (e.g., an instruction pointer that is the address of the next instruction to be executed), etc.

In some embodiments, decode unit 132 may receive instructions from CPU 112 (and/or GPU 116) that may include an identification of the operation to be performed (e.g., modular division, modular inversion, etc.) together with the input values (e.g., U and/or M). Decode unit 132 may store the received input values in registers 138. Decode unit 132 may store (or access previously stored) some additional numbers (e.g., 2M and 3M), as described in more detail below. Decode unit 132 may then use a decoding circuitry (e.g., one or more multiplexers, as described in more detail below in conjunction with FIG. 4) to determine one or more operations to be performed on the input value by execution unit 134, such as addition operations, division (e.g., bit-shifting) operations, and the like. During execution of the operations by execution unit 134, intermediate values may be stored in registers 138. After the completion of the modular division or inversion computations, the final output may be moved to CPU cache 114 (or GPU cache 118). In some embodiments, after completion of the computations, memory access unit 136 may provide to CPU 112 (or GPU 116) an identification of a register 138 storing the final output and CPU 112 (or GPU 116) may fetch the final result directly from the corresponding register.

The computer device 100 may further include an input/output (I/O) component 104 to facilitate connection of computer device 100 to various peripheral hardware devices (not shown) such as card readers, terminals, printers, scanners, IoT devices, and the like. Computer device 100 may further include a network interface 106 to facilitate connection to a variety of networks (Internet, wireless local area networks (WLAN), personal area networks (PAN), public networks, private networks, etc.), and may include a radio front end module and other devices (amplifiers, digital-to-analog and analog-to-digital converters, dedicated logic units, etc.) to implement data transfer to/from computer device 100.

Figure 2A:
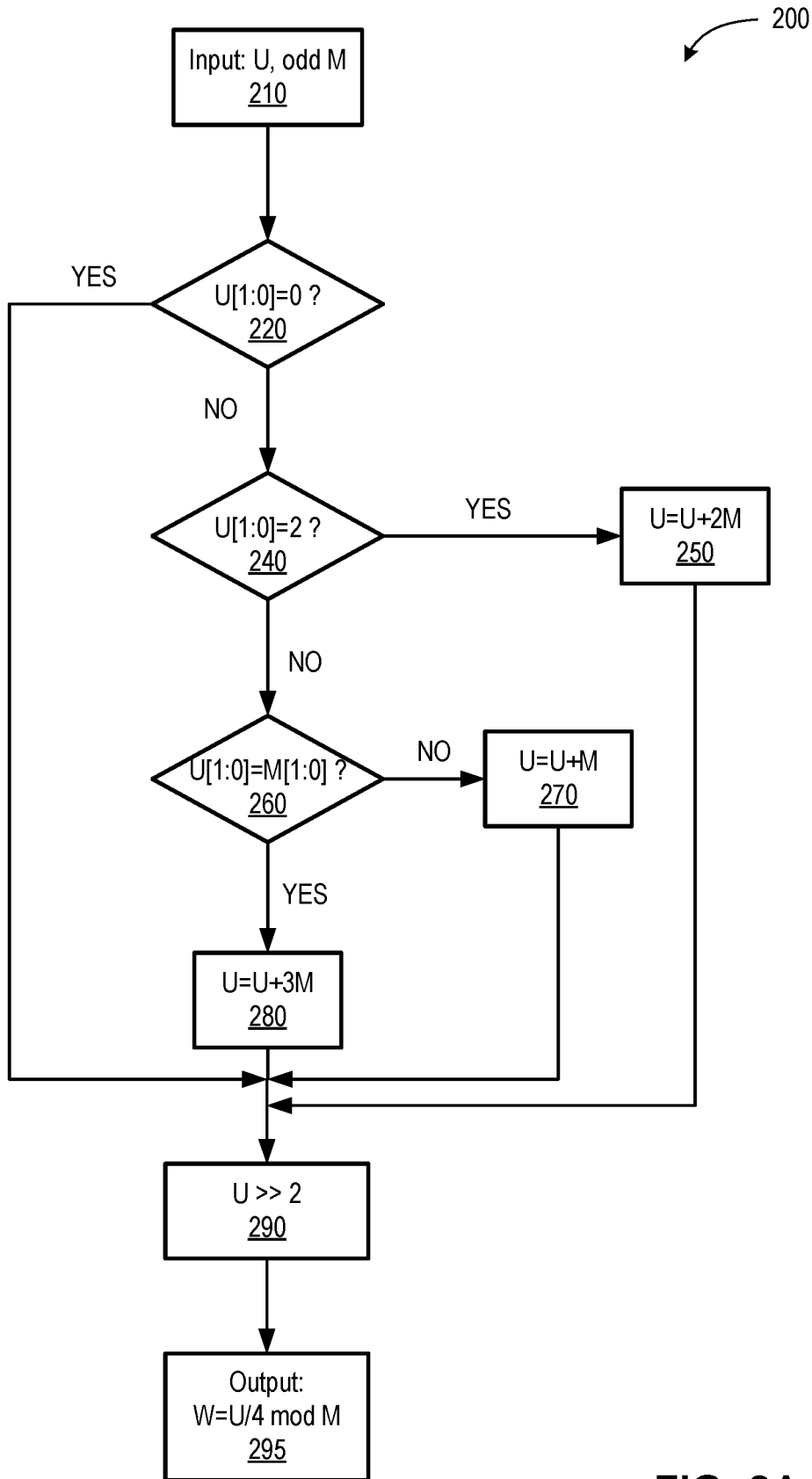
FIG. 2A depicts a flowchart illustrating an example operations of modular division by four that may be used for efficient implementation of cryptographic operations, in accordance with at least some embodiments.

FIG. 2A depicts a flowchart illustrating an example operations 200 of modular division by four that may be used for efficient implementation of cryptographic operations, in accordance with at least some embodiments. In some embodiments, example operations 200 may be implemented by various units of accelerator circuit 130. In some implementations, example operations 200 may be implemented by a combination of CPU 112 (GPU 116) and accelerator 130, by a combination of accelerator 130 and software executed by CPU 112 (GPU 116), or purely by software executed by CPU 112 (GPU 116). More specifically, in the course of modular division, e.g., based on the extended binary Euclidean algorithms, a computationally expensive modular division by four operation, W=U/4 mod M, may be encountered. The output of the modular division by four, W, is a number that, being multiplied by four, gives number U, up to an integer number m of the modulus M: 4W=U+mM. Since the numbers U and W are defined on the ring $Z_M$=[0, M−1], the integer value m satisfies the condition, 0≤m≤3. Accordingly, to determine desired output W, the accelerator circuit may first identify such value m that the sum U+mM is an integer of 4 or, stated equivalently, the binary representation of the sum U+mM has each of the two least significant bits equal to 0. The value W is then obtained from the value U+mM by bit shifting this value by two bits to the right, (U+mM)>>2→W.

As depicted, the input (block 210) into operations 200 may include an odd modulus M and dividend U, which may be odd or even. If it is determined, at block 220, that bits 0 and 1 of U are zero (in other words, the bits have value U[1:0]=0), number U is divisible by 4 and the output W=U/4 is performed by bit-shifting by two bits to the right at block 290. If any of the two least significant bits is non-zero, U[1:0]≠0, the process may continue with determining if U is even by checking, at block 240, if the two least significant bits have value two: U[1:0]=2 (binary value 10). If so, setting m=2 and adding U+mM=U+2M (at block 250) produces the number that is divisible by four. (Since any two even numbers not divisible by four add up to a sum that is divisible by four.) The process then proceeds to the bit-shifting block 290 where output 295 is generated.

If number U is odd, at block 260, the process continues with determining if U[1:0]=1 (binary value 01) or U[1:0]=3 (binary value 11). Since modulus M is an odd number, the values 1 and 3 are also the two values that the last two significant bits M[1:0] of the modulus M may have. Accordingly, if the pairs of bits of U and M have different values, U[1:0]≠M[1:0], the value m=1 is selected at block 270, as the (binary) sum of 11 (three) and 01 (one) is 100 and the resulting number U+M is divisible by four. If both pairs of bits have the same value, U[1:0]=M[1:0] (regardless of whether this value is 1 or 3), the value m=3 is selected at block 280. For example, if U[1:0]=M[1:0]=1 (binary value 01), the last two significant bits of 3M are 11 and the sum U[1:0]+M[1:0]=4 (binary value 100). If U[1:0]=M[1:0]=3 (binary value 11), the last two significant bits of 3M are 01 (since, 3×3=1 mod 4). This ensures that the sum U+3M is divisible by four.

One possible embodiment of example operations 200 that use a conditional case environment is presented below in TABLE 1; gcd stands for the greatest common denominator and the second number in each like within the case environment represent the value U[1:0] for which the operation(s) in the corresponding line are performed:

TABLE 1

Modular division with branching instructions

Figure 2B:
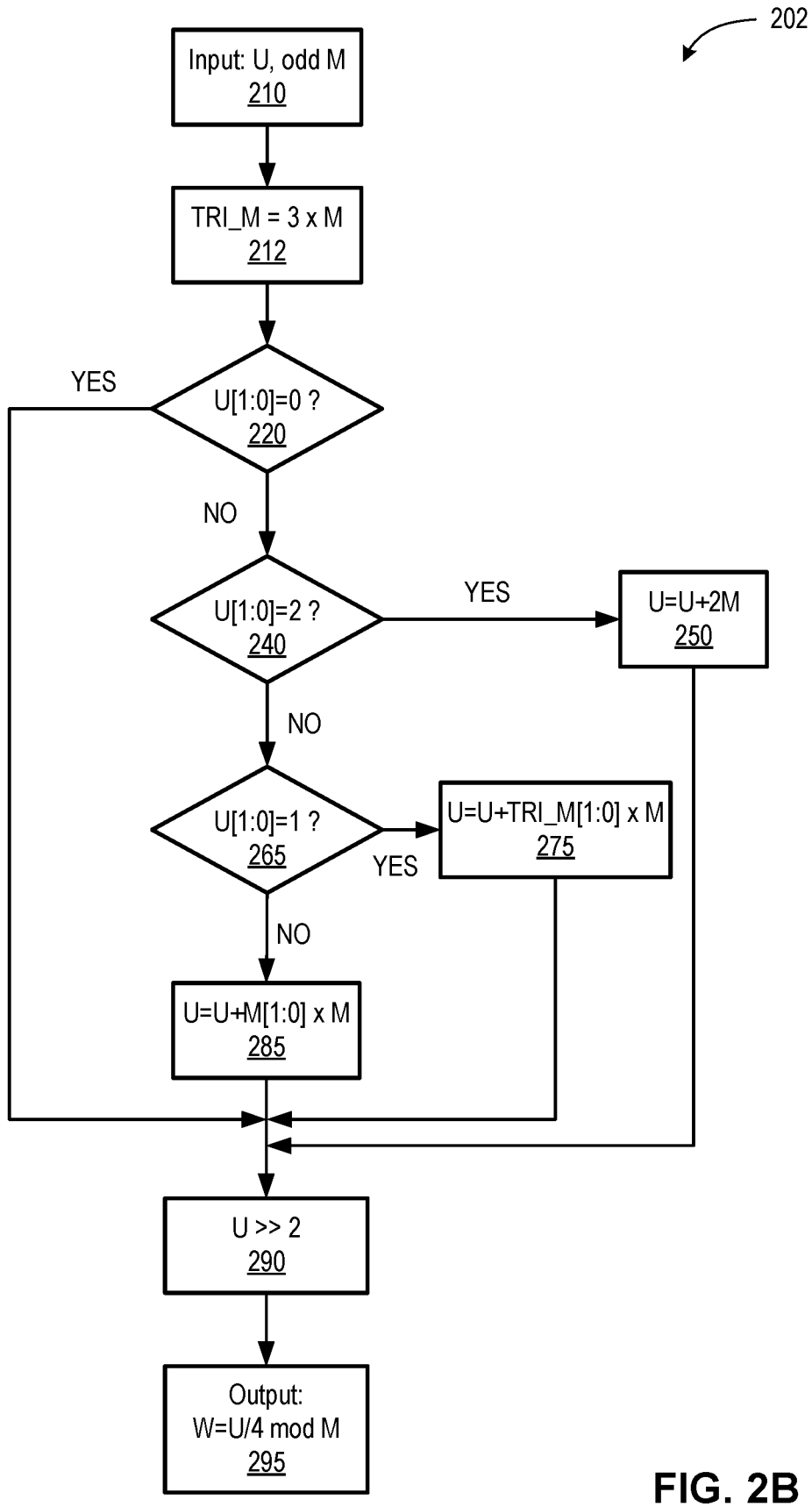
FIG. 2B illustrates modified example operations of modular division by four with eliminated branching operations, in accordance with at least some embodiments.

Input: U, M; gcd(M, 2) = 1
Output: W = U/4 mod M
1:  case (U[1: 0])
2:      0: U := U;
3:      1: if (M[1: 0] = 3) U := U + M; else U := U + 3 × M;
4:      2: U := U + 2 × M;
5:      3: if (M[1: 0] = 3) U := U + 3 × M; else U := U + M;
6:  endcase
7:  U := U >> 2.
8:  return U This embodiment involves the use of branching "if . . . else . . . " operations within the case environment. Processing of branching operations involves additional computational cycles and reduces the overall efficiency of computations. FIG. 2B illustrates modified example operations 202 of modular division by four with eliminated branching operations, in accordance with at least some embodiments. More specifically, an operation 212 is added, which computes an auxiliary number TRI_M=3×M. In some embodiments, operation 212 computes merely two least significant bits TRI_M[1:0] of the product 3×M. FIG. 2B has decision-making blocks 220, 240, and 260, which may be implement via a single case environment, as described below.

Processing responsive to even values of U[1:0] (blocks 220-250 in FIG. 2A) may be performed similarly to the respective blocks in example operations 200, whereas processing responsive to odd values of U[1:0] (blocks 260-280 in FIG. 2A) may be modified. In particular, if it is determined, at block 265, that U[1:0]=3, the processing moves to block 285 that computes a new value U: =U+M[1:0]×M. This operation yields the correct value U since the product M[1:0]×M is equal to M for M[1:0]=1 and is equal to 3M for M[1:0]=3. If it is determined, at block 265, that U[1:0]=1, the processing moves to block 275 that computes a new value U: =U+TRI_M[1:0]×M. Again, this operation yields the correct value U since the product TRI_M[1:0]×M[1:0] is equal to 3M for M[1:0]=1 and is equal to M for M[1:0]=3.

Using the conditional case environment, example operations 202 may be performed as in TABLE 2 below:

TABLE 2

Modular division without branching instructions

Figure 3A:
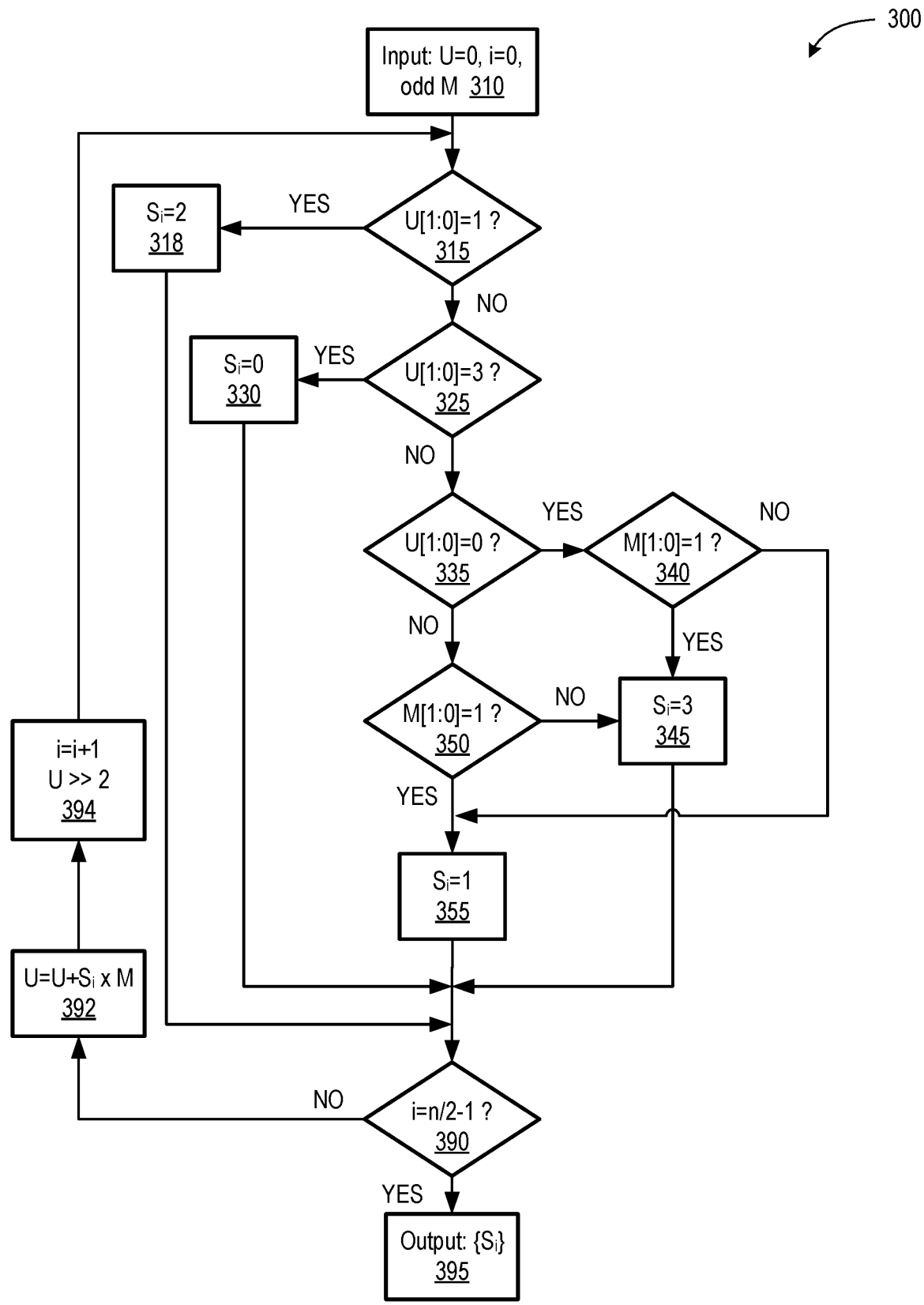
FIG. 3A illustrates example operations of modular inversion that may be used for efficient implementation of cryptographic operations, in accordance with at least some embodiments.

Input: U, M; gcd(M, 2) = 1.
Output: W = U/4 mod M
1:      TRI_M := 3 × M;
2:  case (U[1: 0])
3:      0: U := U;
4:      1: U := U + TRI_M [1: 0] × M;
5:      2: U := U + 2 × M;
6:      3: U := U + M[1: 0] × M;
7:  endcase
8:  U := U >> 2.
9:  return U FIG. 3A illustrates example operations 300 of modular inversion that may be used for efficient implementation of cryptographic operations, in accordance with at least some embodiments. For example, modular inversion may be used as part of Montgomery multiplication. A modular inversion may involve computing $S=-M^{-1} \bmod 2^n$ (or $S=M^{-1} \bmod 2^n$) for an odd M, with a modulus $2^n$ that is an integer power of two. The output of the modular inversion, S, is a number that, being multiplied by M and added to unity, gives an integer number k of the modulus: $S \times M = k \times 2^n - 1$. Representing the unknown number S via two-bit words $S_{n/2-1} \ldots S_i S_0$ as $S = \ldots + S_3 \cdot 4^3 + S_2 \cdot 4^2 + 4 \cdot S_1 + S_0$, the above equation for S can be rewritten as $$(\ldots + S_3 \cdot 4^3 + S_2 \cdot 4^2 + 4 \cdot S_i + S_0) \times M = \ldots 3 \cdot 4^3 + 3 \cdot 4^2 + 3 \cdot 4 + 3.$$

The first pair of bits $S_0$ of the modular inverse may be determined (at iteration i=0) from the condition $$S_0 \times M[1:0] = 3,$$

and, since for any odd M, the last two significant bits M[1:0]=1 (01 in the binary representation) or 3 (11 in the binary representation), $S_0$ is either 3 or 1. An auxiliary quantity (a partial sum) may then be computed as follows $$U_1 = S_0 \times M >> 2,$$

namely, as the product $S_0 \times M$ right-shifted by two bits (with the two least significant bits discarded). In other words, the auxiliary number $U_1$ accounts for the carry of the multiplication of two-bit multiplier $S_0 \equiv S[1:0]$ and multiplicand M. The next two bits of the modular inverse, $S_i \equiv S[3:2]$, may then be found during the next (i=1) iteration based on the condition, $$S_i \times M[1:0] + U_1 = 3 + \text{carry}_1 \cdot 4,$$

and the auxiliary quantity can be updated as follows, $$U_2 = S_i \times M + U_1 \gg 2,$$

which accounts for the carry ($\text{carry}_1$) into the next (i=2) iteration. This process may be continued for the subsequent iterations, including the last (i=n/2) iteration. As a result, the bits of the multiplier S are determined in such a way that forces all n least significant digits of the product $S \times M$ to be equal to 1. Specifically, to determine value $S_i$, the auxiliary value is first updated, $$U_i = S_{i-1} \times M + U_{i-1} \gg 2,$$

and $S_i$ is then determined from the condition, $$S_i \times M[1:0] + U_i = 3 + \text{carry}_i \cdot 4,$$

where $\text{carry}_i$ is a carry value generated in i-th iteration. Determination of value $S_i$ based on auxiliary value $U_i$ will now be described in conjunction with various blocks of FIG. 3A.

If, during i-th iteration, it is determined, at block 315, that the current value of the two least significant bits of the partial sum U is $U[1:0]=1$ (binary value 01), the value $S_i=2$ may be identified (block 318) regardless of whether $M[1:0]=1$ or 3. Indeed, in both cases $2 \times M[1:0]=2$ mod 4, as required by the condition $S_i \times M[1:0]+1=3$ mod 4. If it is determined, at block 325, that the current value of the two least significant bits of the partial sum is $U[1:0]=3$ (binary value 11), the value $S_i=0$ (block 330) regardless of whether $M[1:0]=1$ or 3, as required by the condition $S_i \times M[1:0]+3=3$ mod 4.

For other values of $U[1:0]$, the value $S_i$ is dependent on $M[1:0]$. For example, if at block 335 it is determined that $U[1:0]=0$ and $M[1:0]=1$ (YES branch of block 340), the value $S_i=3$ (block 345) as $S_i \times M[1:0]+U[1:0]=3 \times 1+0=3$. On the other hand, if $M[1:0] \neq 1$ (NO branch of block 340), meaning that $M[1:0]=3$, then the value $S_i=1$ (block 355) as $S_i \times M[1:0]+U[1:0]=1 \times 3+0=3$. Similarly, if it is determined that $U[1:0] \neq 0$ (NO branch of block 335), meaning that $U[1:0]=2$, and $M[1:0]=1$ (YES branch of block 350), the value $S_i=1$ (block 355) as $S_i \times M[1:0]+U[1:0]=1 \times 1+2=3$. On the other hand, if $M[1:0] \neq 1$ (NO branch of block 350), meaning that $M[1:0]=3$, then the value $S_i=3$ (block 345) because $S_i \times M[1:0]+U[1:0]=3 \times 3+2=3$ mod 4. At block 390, the process continues with determining whether the final iteration has just been performed (i=n/2−1). If additional iterations are to be performed (NO branch of block 390), the process may continue with updating the partial sum U (as indicated by block 392), displacing the two least significant bits of the updated partial sum and increasing the iteration counter (as indicated by block 394) and returning the control to block 315 for the next iteration.

One possible implementation of example operations 300 using a conditional case environment is presented in TABLE 3 below:

TABLE 3

Modular inversion with branching instructions

Figure 3B:
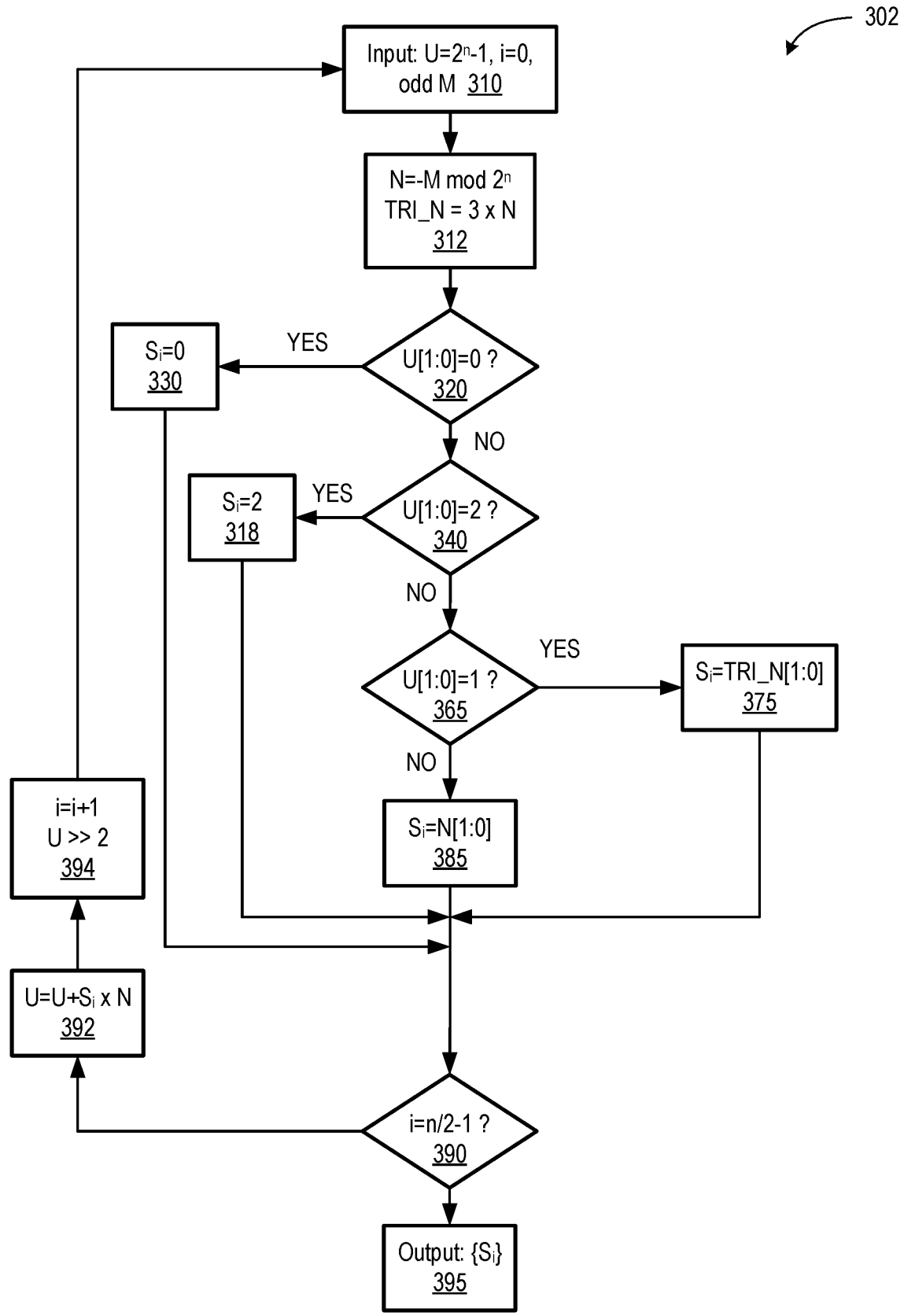
FIG. 3B illustrates modified example operations of modular inversion with eliminated branching operations, in accordance with at least some embodiments.

Input: U, $2^{n-1} < M < 2^n$; gcd(M, 2) = 1
Output: $-M^{-1}$ mod $2^n$
1: U: = 0
2: for i: = 0 to n/2 − 1 do
3:   case (U[1: 0])
4:     0: if (M[1: 0] = 3) $S_i$ = 1; U := U + M; else $S_i$ = 3; U := U + 3 × M;
5:     1: $S_i$ = 2; U := U + 2 × M;
6:     2: if (M[1: 0] = 3) $S_i$ = 3; U := U + 3 × M; else $S_i$ = 1; U := U + M;
7:     3: $S_i$ = 0; U := U;
8:   endcase
9:   U := U ≫ 2;
10: endfor
11: S = $S_{n/2-1}$ ... $S_1, S_0$.
12: return S Like embodiments of operations 200 in FIG. 2A, this embodiment of operations 300 involves the use of branching operations "if . . . else . . . " within the case environment. FIG. 3B illustrates modified example operations 302 of modular inversion with eliminated branching operations, in accordance with at least some embodiments. An additional advantage of example operations 302 is that operations 302 largely parallel example operations 202 of modular division and, as described below in conjunction with FIG. 4, may be implemented using the same hardware circuitry. More specifically, a new number N may be introduced such that $N=-M$ mod $2^n=2^n-M$ (the latter equality being valid as long as $M \in [0, 2^n-1]$). The equation $S \times M = k \times 2^n - 1$ can now be restated in terms of N as follows: $S \times N + 2^n - 1 = k \times 2^n$ or in the expanded form $$(\ldots + S_3 \cdot 4^3 + S_2 \cdot 4^2 + 4 \cdot S_1 + S_0) \times N + 2^n - 1 = \ldots 0 \cdot 4^3 + 0 \cdot 4^2 + 0 \cdot 4 + 0.$$

During iteration i=0 the first pair of bits $S_0$ of the modular inverse is determined from the condition $$S_0 \times N[1:0] + U_0 = 0 + \text{carry}_0 \cdot 4,$$

where $U_0$ is $2^n-1$, and a partial sum is computed as follows:

$$U_1 = S_0 \times N + U_0 \gg 2.$$

During subsequent iterations, after the partial sum is updated according to, $$U_i = S_{i-1} \times N + U_{i-1} \gg 2,$$

additional pairs of bits of the modular inverse, $S_i$, may be computed using the condition, $$S_i \times N[1:0] + U_i = 0 + \text{carry}_i \cdot 4.$$

From the last equation it follows that when $U_i[1:0]=0$, the value $S_i=0$ and when $U_i[1:0]=2$, the value $S_i=2$ regardless of whether $N[1:0]=1$ or 3, as in both cases $2 \times N[1:0]+2=0$ mod 4. When $U_i[1:0]=3$, the value $S_i=N[1:0]$. Finally, when $U_i[1:0]=1$, the value $S_i=1$, if $N[1:0]=3$, and $S_i=3$, if $N[1:0]=1$. The last condition may be equivalently recast in the form that does not require "if . . . else . . . " conditional branching, e.g., by defining the auxiliary number $\text{TRI\_N}=3 \times N$. Consequently, $S_i=\text{TRI\_N}[1:0]$.

FIG. 3B illustrates the use of the auxiliary number TRI_N to eliminate decision-making blocks 340 and 350 of FIG. 3A. Operation 312 is added, which computes the auxiliary numbers N and TRI_N. Operations 318, 320, 330, and 340 may be performed similarly to the respective operations of FIG. 3A. If it is determined, at block 365, that $U[1:0]=1$, the processing moves to block 375 that generates the value $S_i$=TRI_N[1:0]. Conversely, if it is determined, at block 365, that U[1:0]=3, the processing moves to block 385 that generates the value $S_i$=N[1:0]. The remaining operations 390, 392, 394, and 395 of FIG. 3B may be performed similarly to the respective operations of FIG. 3A.

An implementation of algorithm 302 using a conditional case environment is presented in TABLE 4 below:

TABLE 4

Modular inversion without branching instructions

Input: U, $2^{n-1} < M < 2^n$; gcd(M, 2) = 1
Output: $-M^{-1}$ mod $2^n$
1:    U: = $2^n$ − 1; N: = −M mod $2^n$; TRI_N: = 3 × N;
2:    for i: = 0 to n/2 − 1 do
3:      case (U[1: 0])
4:        0: $S_i$: = 0; U := U;
5:        1: $S_i$: = TRI_N[1: 0]; U: = U + TRI_N[1: 0] × N;
6:        2: $S_i$: = 2; U := U + 2 × N;
7:        3: $S_i$ = N[1: 0]; U: = U + N[1: 0] × N;
8:      endcase
9:    U := U >> 2;
10:   endfor
11:   S = $S_{n/2-1}$ ... $S_1, S_0$.
12:   return S In some embodiments, the number N=−M mod $2^n$ is not introduced and the computations are based on the identity, S×M+1=k×$2^n$, using the modulus M directly and setting the initial value of U to one, as illustrated in TABLE 5 below:

TABLE 5

Another implementation of modular inversion without branching instructions

Input: U, $2^{n-1} < M < 2^n$; gcd(M, 2) = 1
Output: $-M^{-1}$ mod $2^n$
1:    U: = 1; TRI_M: = 3 × M;
2:    for i: = 0 to n/2 − 1 do
3:      case (U[1: 0])
4:        0: $S_i$: = 0; U := U;
5:        1: $S_i$: = TRI_M[1: 0]; U: = U + TRI_M[1: 0] × M;
6:        2: $S_i$: = 2; U := U + 2 × M;
7:        3: $S_i$: = M[1: 0]; U: = U + M[1: 0] × M;
8:      endcase
9:    U := U >> 2;
10:  endfor
11:  S = $S_{n/2-1}$ ... $S_1, S_0$.
12:  return S Operations 312-385 of example algorithm 302 of modular inversion depicted in FIG. 3B can be mapped on the corresponding (that have the same two last digits in the numerals) operations 212-285 of example algorithm 202 of modular division depicted in FIG. 2B. As described below in conjunction with FIG. 4, both example operations 202 and example operations 302 may be performed by a common circuit (or a set of circuits).

The embodiments described above determine the output of modular inversion in groups $S_i$ of 2 bits per iteration. As described above, such implementations make use of the partial sums, $U_i = S_{i-1} \times M + U_{i-1} >> 2$, computed iteratively and then determine $S_i$, e.g., from the condition, $S_i \times M[1:0] + U_{i-1} = 0 + \text{carry}_i \cdot 4$. In some embodiments, the output of modular inversion may be determined in groups of $S_i$ of r bits per iteration making use of the partial sums $U_i = S_{i-1} \times M + U_{i-1} >> r$, while determining consecutive r-bit groups $S_i$, e.g., from the condition, $S_i \times M[r-1:0] + U_{i-1} = 0 + \text{carry}_i \cdot 2^r$. In such embodiments, the number of iterations performed within the former environment may be n/r. More specifically, the computations may be performed as illustrated in TABLE 6 below:

TABLE 6

Modular inversion without branching instructions with r-bit iterations

Input: U, $2^{n-1} < M < 2^n$; gcd(M, 2) = 1
Output: $-M^{-1}$ mod $2^n$
1:    U: = X; MR(1): = $M^{2^{r-1}-1}$ mod $2^r$; MR(3): = 3 × $M^{2^{r-1}-1}$ mod $2^r$;
      MR(5): = 5 × $M^{2^{r-1}-1}$ mod $2^r$; ... MR($2^r$ − 1): = ($2^r$ − 1) × $M^{2^{r-1}-1}$ mod $2^r$;
2:    for i: = 0 to n/r − 1 do
3:      case (U[r − 1: 0])
4:        0: $S_i$: = 0; U := U;
5:        1: $S_i$: = MR($2^r$ − 1); U: = U + MR($2^r$ − 1) × M;
6:        2: $S_i$: = 2 × MR($2^{r-1}$ − 1); U: = U + 2 × MR($2^{r-1}$ − 1) × M;
7:        3: $S_i$: = MR($2^r$ − 3); U: = U + MR($2^r$ − 3) × M;
8:        4: $S_i$: = 4 × MR($2^{r-2}$ − 1); U: = U + 4 × MR($2^{r-2}$ − 1) × M;
9:        ...
10:       $2^r$ − 4: $S_i$: = 4 × MR(1); U: = U + 4 × MR(1) × M;
11:       $2^r$ − 3: $S_i$: = MR(3); U: = U + MR(3) × M;
12:       $2^r$ − 2: $S_i$: = 2 × MR(1); U: = U + 2 × MR(1) × M;
13:       $2^r$ − 1: $S_i$: = MR(1); U: = U + MR(1) × M;
14:      endcase
15:    U := U >> r;
16:  endfor
17:  S = $S_{n/r-1}$ ... $S_1, S_0$.
18:  return S As specified in line 1 of this algorithm, $2^{r-1}$ auxiliary numbers, derived from number M may be defined (and stored at the beginning of the computations). For a specific instance of r=3, the computations may be performed as illustrated in TABLE 7 below:

TABLE 7

Modular inversion without branching instructions with 3-bit iterations

Input: U, $2^{n-1} < M < 2^n$; gcd(M, 2) = 1
Output: $-M^{-1}$ mod $2^n$
1:    U: = 1; TRI_M: = 3 × M; 1MC = $M^3$; 3MC = 3 × $M^3$; 5MC = 5 × $M^3$; 7MC = 7 × $M^3$
2:    for i: = 0 to n/3 − 1 do
3:      case (U[2: 0])
4:        0: $S_i$ = 0; U := U;
5:        1: $S_i$: = 7MC[2: 0]; U: = U + 7MC[2: 0] × M;
6:        2: $S_i$: = 2 × TRI_M[1: 0]; U: = U + 2 × TRI_M[1: 0] × M;
7:        3: $S_i$: = 5MC[2: 0]; U: = U + 5MC[2: 0] × M;
8:        4: $S_i$: = 4; U: = U + 4 × M;
9:        5: $S_i$: = 3MC[2: 0]; U: = U + 3MC[2: 0] × M;
10:       6: $S_i$: = 2 × M[1: 0]; U: = U + 2 × M[1: 0] × M;
11:       7: $S_i$: = 1MC[2: 0]; U: = U + 1MC[2: 0] × M;
12:      endcase
13:    U := U >> 3;
14:  endfor
15:  S = $S_{n/3-1}$ ... $S_1, S_0$.
16:  return S Whereas modular inversion with 2-bit iterations (as illustrated in TABLE 4 and TABLE 5) makes use of the fact that a square of any odd number M is equal to one modulo 4, $M^2 = 1$ (mod $2^2$). Similarly, a fourth power of any odd number M is equal to one modulo 8, $M^4 = 1$ (mod $2^3$). Therefore, the following identity is true, $(Z \times M^3) \times M$ mod 8=Z, for Z=1, 3, 5, 7, which has been used in operations listed in lines 5, 7, 9, and 11 of TABLE 7.

The modular inversion with r-bit iterations map on modular division U/$2^r$ mod M and can, therefore, be performed in a similar fashion (e.g., using the same accelerator circuits), similarly to how operations of TABLE 2 and TABLEs 4 and 5 can be performed for r=2.

Figure 4:
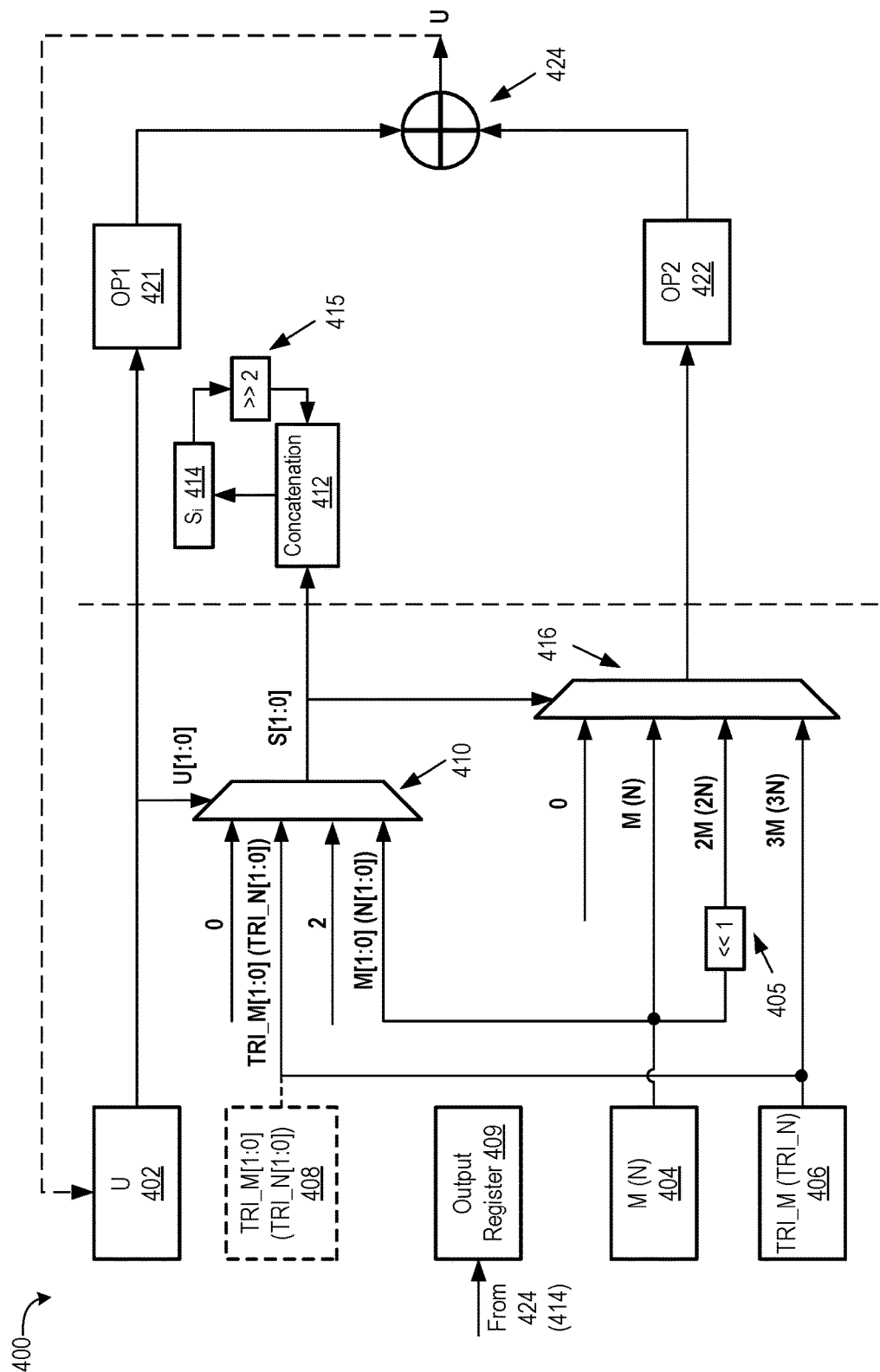
FIG. 4 illustrates an example accelerator circuit capable of performing modular division by four and modular inversion, in accordance with at least some embodiments.

FIG. 4 illustrates an example accelerator circuit 400 capable of performing modular division by four and modular inversion, in accordance with at least some embodiments. Example values stored and input into various registers and circuits in FIG. 4 are specified for modular division (with corresponding example values for modular inversion indicated in the parentheses). Registers 402, 404, and 406 may be storing inputs into the computations, and may include any suitable memory devices, such as integer number registers (e.g., wide integer progress registers), fixed point registers, floating point registers, and the like. At the beginning of computations, register 402 may be storing the initial value of U, e.g., U=0 for modular division (or $U=2^n-1$ for modular inversion). During modular inversion computations, the content of register 402 may be updated after each cycle of computations. Register 404 may store modulus M for modular division (or value $N=-M \bmod 2^n$ for modular inversion). Register 406 may store precomputed value TRI_M for modular division (or value TRI_N for modular inversion). The 4-operation case environment, described above in conjunction with FIG. 2B and FIG. 3B, may be implemented using a first multiplexer 410 and a second multiplexer 416. Two least significant bits U[1:0] of register 402 may be used as a control signal into first multiplexer 410. Four input signals into multiplexer 410 may include:

0, selected when U[1:0]=0;
TRI_M [1:0], (TRI_N[1:0]) selected when U[1:0]=1;
2, selected when U[1:0]=2; and
M[1:0], (N[1:0]), selected when U[1:0]=3.

The input M[1:0], (N[1:0]) may be obtained from the last two significant bits of register 404, and the input 3M[1:0], (3N[1:0]) may be obtained from the last two significant bits of register 406. In some embodiments, the input TRI_M [1:0], (TRI_N[1:0]) may be obtained from a separate dedicated register 408 (which may be a two-bit register) indicated with a dashed box. Similarly, in some embodiments, the input M[1:0], (N[1:0]) is may be obtained from a separate (e.g., two-bit) register (not shown in FIG. 4).

The two-bit output S[1:0] of multiplexer 410 may serve as a control signal into second multiplexer 416. The four input signals into second multiplexer 416 may be 0, M(N), 2M(2N), and 3M(3N). The input value 2M(2N) may be obtained from register 404 using a single-bit shifter 405. In some embodiments, the input 2M(2N) may be obtained from a dedicated register (not shown) storing value 2M(2N). The output of second multiplexer 416 is the multiplication product S[1:0]×M, each output signal selected when the respective value S[1:0] is output by first multiplexer 410.)

In the instances of modular division, value U may be provided as an operand OP1 421 into instruction execution unit and the multiplication product S[1:0]×M may be provided as operand OP2 422. An addition (adder) circuit 424 may then add the two operands, to generate the value U+S[1:0]×M. This value may be processed by a two-bit shifter (not shown in FIG. 4) and stored as the final output U/4 mod M of the modular division in an output register 409.

In the instances of modular inversion, an additional sub-circuit may be used to collect bits of the output value $S=-M^{-1} \bmod 2^n$. In particular, previously computed (and concatenated) pairs of bits $S_{i-1} \ldots S_1, S_0$ output by first multiplexer 410 may be stored in a scratch buffer 414. During i-th iteration, concatenation logic 412 may cause a bit shifter 415 to shift the previously computed pairs of bits $S_{i-1} \ldots S_1, S_0$ by two bits to the right and append the new pair of bits $S_i$ on the left before storing in scratch buffer 414 the new value: $S_i, S_{i-1} \ldots S_1, S_0$. Additionally, as depicted with the dashed arrow, the value U+S[1:0]×N generated by addition circuit 422 may be used to overwrite previously stored value U in register 402, whose first two bits are then used as the control signal into first multiplexer 410 during the next i+1-th processing iteration. At the end of computations, after all iterations are completed, the value $S_{n/2-1} \ldots S_1 S_0$ may be moved from scratch buffer 414 to output register 409.

The code below illustrates one possible example instructions to perform modular division computations using accelerator circuit 400 (with comments following the double slash//sign):

```
MOV REG1 U; // Value U is stored in register 402
MOV REG2 M; // Value M is stored in register 404
MOV REG3 M; // Value M is copied to register 406
TRI REG3; // Value M is tripled M → M in register 406
MDIV4 REG1 REG2 REG3; // Execution of the case environment
SRL REG1 #2; // Division by 4 is performed by a two-bit right shift of the
    value U in register 402
```

Similarly, the code below illustrates one possible example instructions to perform modular inversion computation that uses accelerator circuit 400:

```
MOV REG0 #0; // Zero value is stored in register 0 (which may be output
    register 409 or some other register not shown in FIG. 4)
SUB REG1 REG0 #1; // Value U = 2^n - 1 is computed and stored in
    register 402
MOV REG3 M; // Value M is stored in register 406
SUB REG2 REG0 REG3; // Value N is computed and stored in register
404
MOV REG3 REG2; // Value N is copied to register 406
TRI REG3; // Value N is tripled N → 3N in register 406
MOV REG4 n; // Counter n is stored in register 409
SRL REG4 #1; // One-bit right shift to obtain n/2 in register 409
_FOR_LOOP_BEGIN:
MDIV4 REG1 REG2 REG3; //Execution of case environment
SRL REG1 #2; // Two-bit right shift to obtain... U >>2
SUB REG4 REG4 #1; // Counter value in register 409 is reduced by 1
BNE_FOR_LOOP_BEGIN; // End of loop
SMOV REG4; // Move computed value -M^-1 mod 2^n from scratch buffer
    414 to output register 409
```

Figure 5:
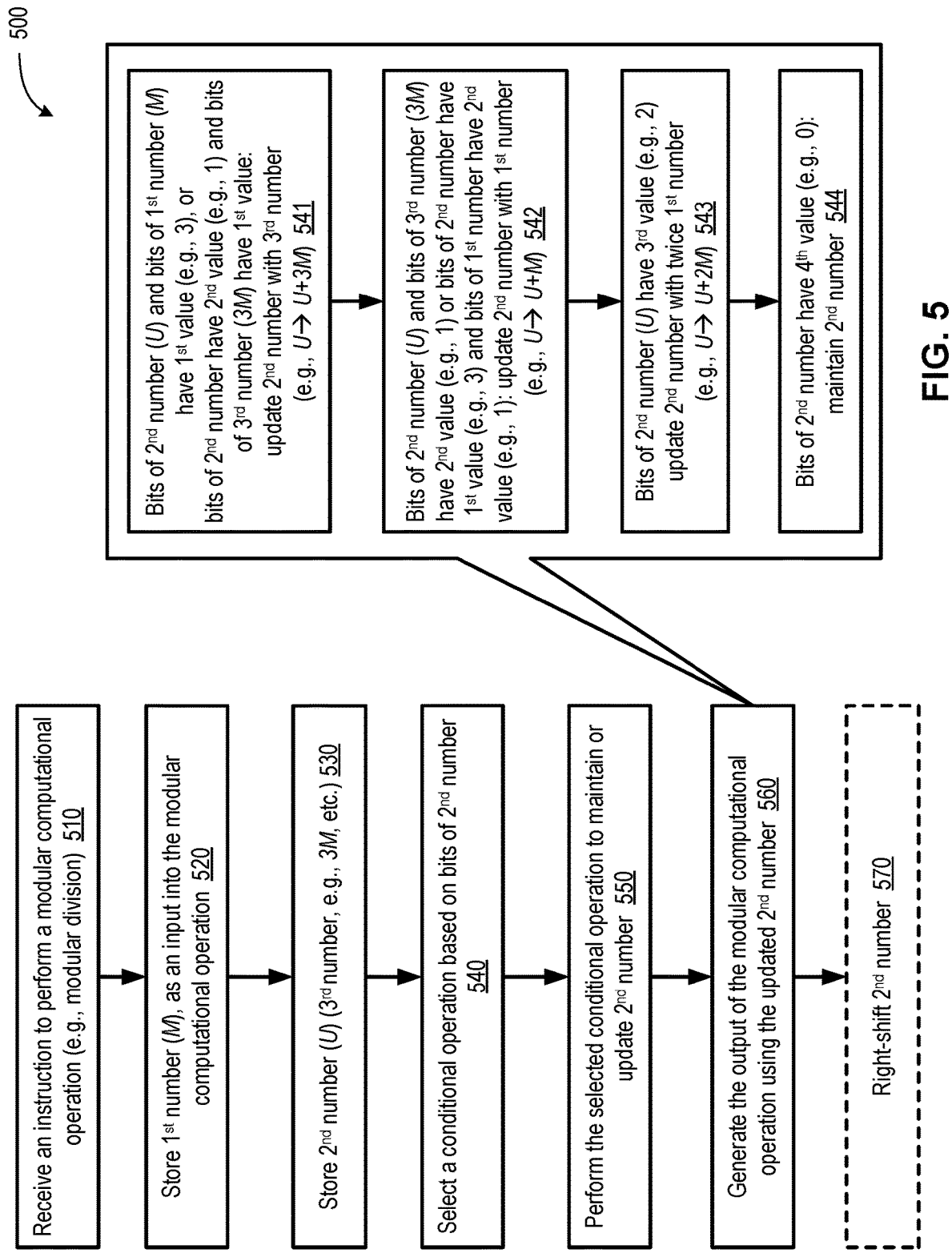
FIG. 5 is a flow diagram of an example method of efficient and fast modular division by four, in accordance with at least some embodiments.
Figure 6:
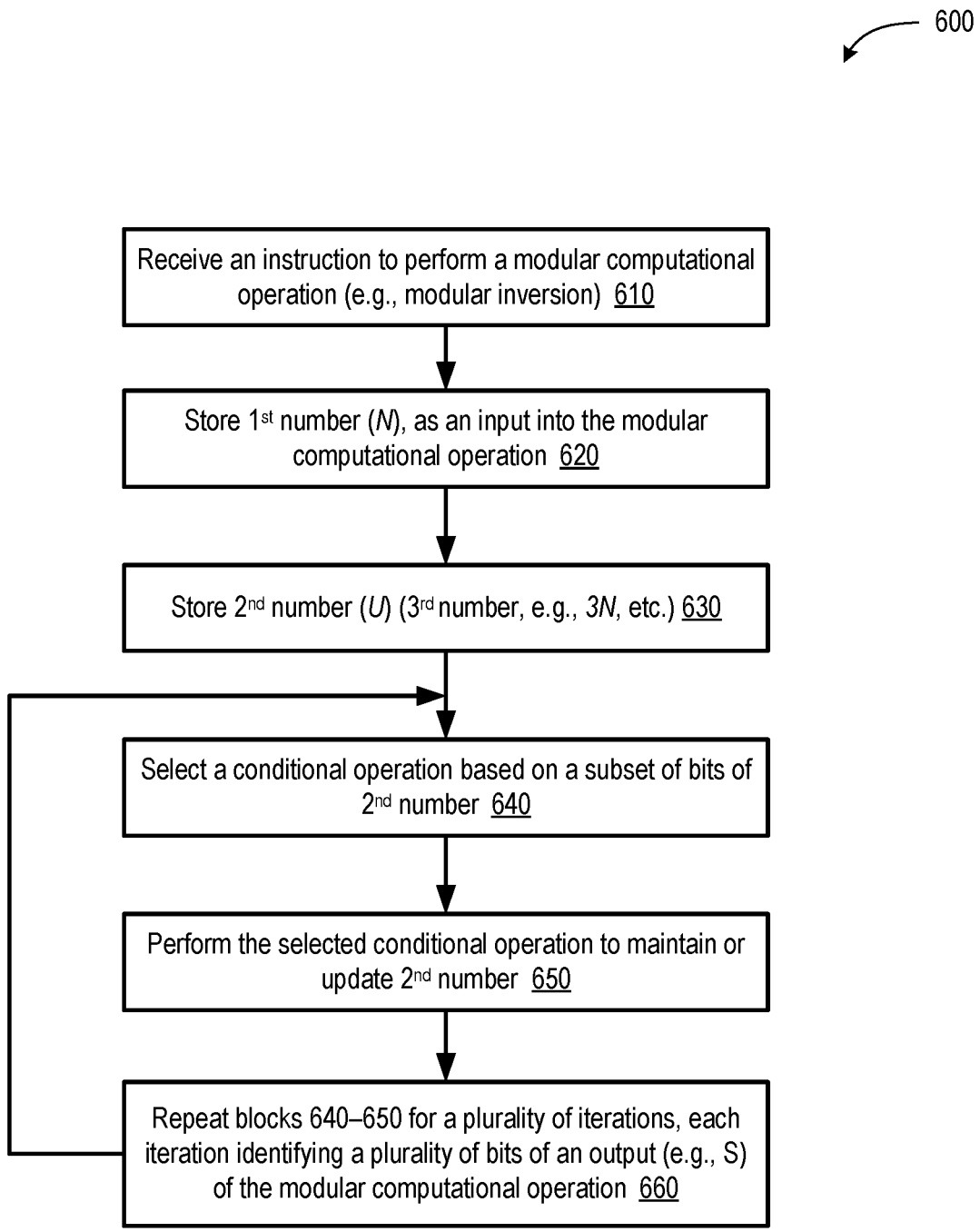
FIG. 6 is a flow diagram of an example method of efficient and fast modular inversion, in accordance with at least some embodiments.

FIG. 5 and FIG. 6 are flow diagrams of example methods 500 and 600 of fast and efficient modular computations, in accordance with at least some embodiments. In some embodiments, methods 500 and 600 may be performed by processing units of accelerator circuit 130 of FIG. 1 that may include (or communicate with) one or more memory devices (e.g., registers). In some embodiments, methods 500 and 600 may be performed responsive to instructions from CPU 112 (or GPU 116). In some embodiments, method 500 and 600 may be executed by one or more processing threads, each thread executing one or more individual functions, routines, subroutines, or operations of the methods. In some embodiments, processing threads implementing each of methods 500 and 600 may be synchronized (e.g., using semaphores, critical sections, and/or other thread synchronization mechanisms). Alternatively, processing threads implementing each of methods 500 and 600 may be executed asynchronously with respect to each other. Various operations of methods 500 and 600 may be performed in a different order compared with the order shown in FIG. 5 and FIG. 6. Some operations of methods 500 and 600 may be performed concurrently with other operations. In some embodiments, one or more operations shown in FIG. 5 and FIG. 6 may be optional.

For brevity and conciseness, the architecture and operations of example accelerator circuit 400 are illustrated using 2-bit iterations of modular inversion $-M^{-1} \bmod 2^n$ and modular division by four: U/4 mod M. It should be understood, however, that accelerator circuits of substantially similar architectures and performing similar operations may be used for r-bit iterations of modular inversion $-M^{-1}$ mod $2^r$ and modular division $U/2^r$ mod M. In particular, in the instance of r=3, multiplexers 410 and 416 may be 8-input multiplexers ($2^r$-input multiplexers, in the more general case), where some of the inputs may be previously computed and stored auxiliary numbers, e.g., as illustrated above in TABLE 6 and TABLE 7.

FIG. 5 is a flow diagram of an example method 500 of efficient and fast modular division by four, in accordance with at least some embodiments. Method 500 may be performed by a dedicated accelerator engine, e.g., accelerator circuit 130 of FIG. 1. In some embodiments, method 500 may be performed by a cryptographic engine configured to perform public/private key cryptographic computations, or by a general-purpose CPU (or GPU). Processing units that perform method 500 may include decode unit 132, execution unit 134, memory access unit 136, and other units of accelerator circuit 130 (e.g., fetch unit, scheduler unit, etc.). In some embodiments, method 500 may include, at block 510, receiving an instruction to perform a modular computational operation, e.g., a modular division, U/4 mod M. The instruction may be issued by a CPU, GPU, or any other processing device or that is in communication with the accelerator circuit. At block 520, method 500 may continue with storing a first number in a memory device, e.g., in one of registers 138. The first number may be a modulus M of the modular division operation. At block 530, method 500 may include storing a second number in the memory device. The second number may be a dividend of the modular division, e.g., U. Although in FIG. 5 the operations of storing the first number and the second number (blocks 520 and 530) are depicted as being performed after receiving the instruction (block 510), in some embodiments, the order may be different. For example, the first number M may be stored at boot-up or during initialization of the application that uses method 500 (e.g., an application 102 of FIG. 1). Likewise, the second number U may be stored before or concurrently with receiving the instruction at block 510. In some embodiments, additional numbers, e.g., 2M, TRI_M, M[1:0], TRI_M[1:0], etc., may also be stored as part of operations of block 530. At block 540, the processing units performing method 500 may select a conditional operation to be performed. A conditional operation may include maintaining the second number (e.g., U→U) or modifying the second number, e.g., with a multiple of the first number (e.g., U→U+M, U→U+2M, etc.).

The selection may be from a plurality of conditional operations, with each conditional operation contingent upon a subset of bits of the second number, e.g., the two least significant bits of the second number U[1:0], but may also be contingent upon other numbers. For example, as depicted with the callout portion in FIG. 5, a first conditional operation (block 541) may also be contingent on the first number, e.g., M, and a third number, e.g., TRI_M. The conditional operations may be selected based on subsets of bits of the first number, the second number, and the third number, e.g., based on the subsets of bits that contain two least significant bits of these respective numbers. More specifically, the first conditional operation may include modifying the second number with the third number, e.g., U→U+3M and may be selected provided that one of the following conditions is satisfied: (1) a subset of bits of the second number U[1:0] and the subset of bits of the first number M[1:0] have a first value, e.g., value 3: U[1:0]=3, M[1:0]=3; or (2) the subset of bits of the second number has a second value, e.g., value 1, and the subset of bits of the third number has the first value: U[1:0]=1, TRI [1:0]=3. For example, as depicted in FIG. 4, control signal U[1:0]=3 causes first multiplexer 410 to select control signal M[1:0] for second multiplexer 416, which then selects the number 3M for operand OP2 422 (since M[1:0]=3). Likewise, control signal U[1:0]=1 causes first multiplexer 410 to select control signal TRIM [1:0] for second multiplexer 416, which then selects the number 3M for operand OP2 422 (since TRI_M[1:0]=3). As a result, in both instances, the adder circuit 424 computes the sum U+3M.

As depicted with block 542, a second conditional operation may include modifying the second number with the first number, e.g., U→U+M and may be selected provided that one of the following conditions is satisfied: (1) the subset of bits of the second number U[1:0] and the subset of bits of the third number TRI_M [1:0] have the second value, e.g., U[1:0]=1, TRI_M[1:0]=1; or (2) the subset of bits of the second number has the first value, U[1:0]=3, and the subset of bits of the first number has the second value, M[1:0]=1. For example, as depicted in FIG. 4, control signal U[1:0]=1 causes first multiplexer 410 to select control signal TRI_M [1:0] for second multiplexer 416, which then selects the number M for operand OP2 422 (since TRI_M [1:0]=1). Likewise, control signal U[1:0]=3 causes first multiplexer 410 to select control signal M[1:0] for second multiplexer 416, which then selects the number M for operand OP2 422 (since M[1:0]=1). As a result, in both instances, the adder circuit 424 computing the sum U+M.

As depicted with block 543, a third conditional operation may include modifying the second number with twice the first number, e.g., U→U+2M, and may be selected provided that the subset of bits of the second number has a third value, e.g., U[1:0]=2. For example, as depicted in FIG. 4, control signal U[1:0]=2 causes first multiplexer 410 to select control signal 2 for second multiplexer 416, which then selects the number 2M for operand OP2 422.

As depicted with block 544, a fourth conditional operation may include maintaining the second number and may be selected provided that the subset of bits of the second number has a fourth value, e.g., U[1:0]=0. For example, as depicted in FIG. 4, control signal U[1:0]=0 causes first multiplexer 410 to select control signal 0 for second multiplexer 416, which then selects zero for operand OP2 422.

At block 550, method 500 may continue with the processing units performing the selected conditional operations to maintain or update the second number. For example, as depicted in FIG. 4, the second number, stored as operand OP1 421, may be added to operand OP2 422, which is selected as described above in conjunction with blocks 541-544. In some embodiments, maintaining the second number may include adding the second number, stored as operand OP1 421, to a zero value, stored as operand OP2 422.

At block 560, method 500 may continue with the processing units generating the output of the modular computational operation using the updated second number. For example, as depicted with optional block 570, generating the output of the modular computational operation (e.g., division of the second number by four modulo the first number) may include right-shifting the second number by two bits, U→U/4.

FIG. 6 is a flow diagram of an example method 600 of efficient and fast modular inversion, in accordance with at least some embodiments. Method 600 may be performed by a dedicated accelerator engine or by any other circuitry and/or device that is capable of performing method 500 of FIG. 5. Method 600 and method 500 may have multiple similar operations. Method 600 may include, at block 610, receiving an instruction to perform a modular computational operation, which may be an inverse (e.g., a positive or negative inverse) of a first number modulo a number that is an integer power of two, e.g., a modular inversion, $S=-M^{-1} \mod 2^n$. The instruction may be issued by a CPU (or GPU) of a processor that is in communication with the accelerator circuit. At block 620, method 600 may continue with storing the first number in a memory device, e.g., in one of registers 138. The first number may be an auxiliary number $N=-M \mod 2^n$ or the modulus M. At block 630, method 600 may continue with storing a second number in the memory device, e.g., a partial sum U. The initial value of the partial sum may be $U=2^n-1$ (if the auxiliary number used is N) or $U=1$ (if the auxiliary number used is modulus M itself). In some embodiments, additional numbers, e.g., 2N (2M), TRI_N (TRI_M), N[1:0] (M[1:0]), TRI_N[1:0] (TRI_M[1:0]), etc., may also be stored as part of operations of block 630. At block 640, the processing units performing method 600 may select a conditional operation to be performed. Execution of block 640, as well as types of conditional operations used in execution of block 640 may be the same or similar to execution (as well as corresponding conditional operations) of block 540 of method 500, except in method 600 number M may be (in some embodiments) replaced with number N.

At block 650, method 500 may continue with the processing units performing the selected conditional operations to maintain or update the second number. Block 650 may, likewise, be performed similarly to block 550 of method 500. At block 660, to compute the output of the modular computational operation, the processing units performing method 600 may repeat multiple iterations of blocks 640-650, with each iteration identifying an additional plurality of bits (e.g., two bits) of the output of the modular computational operation, as described in more detail above in conjunction with FIG. 3B.

The description above is intended as an illustration of methods 500 and 600. Numerous variations and embodiments of methods 500 and 600 are also within the scope of this disclosure. In some embodiments, the inputs TRI_M[1:0] and M[1:0] (or inputs TRI_N[1:0] and N[1:0]) into first multiplexer 410 are swapped. To achieve the same output of methods 500 and 600, the inputs M and 3M (or N and 3N) into second multiplexer 416 may, likewise, be swapped.

It should be understood that the accelerator circuit depicted in FIG. 4 does not exhaust all possible embodiments of the disclosed techniques. For example, any accelerator circuit, co-processor, CPU, GPU, FPGA, ASIC, FSM, or any similar device may be capable of performing the disclosed techniques provided that the corresponding device is capable of selecting a conditional operation from a plurality of conditional operations, wherein each of the plurality of conditional operations is selected contingent upon a subset of bits of the second number, e.g., U[1:0] and includes (1) maintaining the second number, e.g., by not subjecting the second number to any operations or by performing one or more null operations (e.g., a null addition), $U \rightarrow U+0$, or (2) modifying the second number with a multiple of the first number, e.g., $U \rightarrow U+M(N)$, $U \rightarrow U+2M(N)$, etc. One conditional operation of the plurality of conditional operation may include adding, to the second number, a number that is equal to a product of the first number and a subset of bits of the third number, wherein the third number is triple the first number, e.g., $U \rightarrow U+TRI\_M[1:0] \cdot M$ (or $U \rightarrow U+TRI\_N[1:0] \cdot N$). Another conditional operation of the plurality of conditional operations may include adding, to the second number, a number that is equal to a product of the first number and a subset of bits of the third number, e.g., $U \rightarrow U+M[1:0] \cdot M$ (or $U \rightarrow U+N[1:0] \cdot N$). Various embodiments that implement such conditional operations and, therefore, avoid the use of "if . . . else . . . " conditional instructions are within the scope of the instant disclosure.

Figure 7:
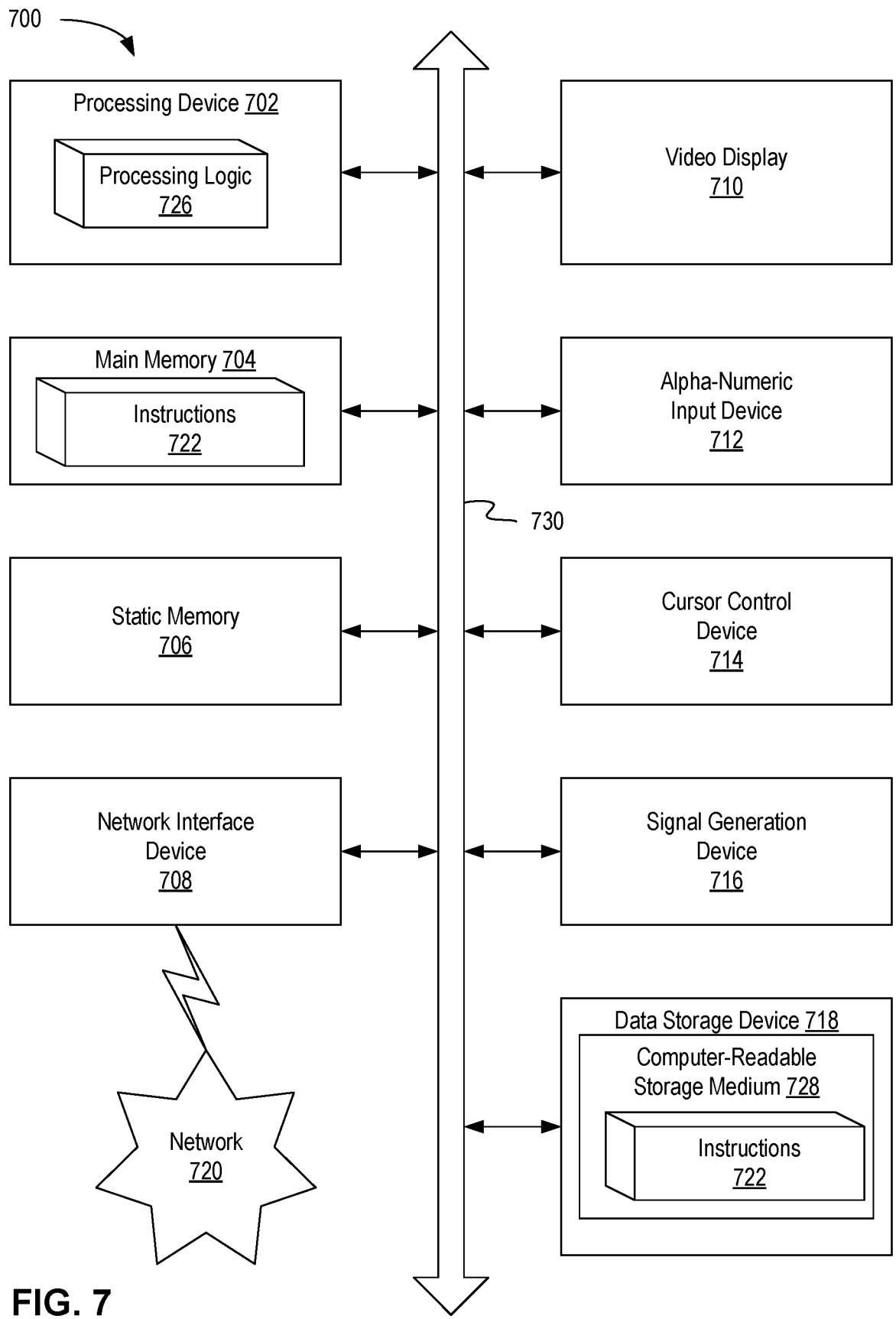
FIG. 7 depicts a block diagram of an example computer system operating in accordance with some implementations of the present disclosure.

FIG. 7 depicts a block diagram of an example computer system 700 operating in accordance with some implementations of the present disclosure. In various illustrative examples, example computer system 700 may be or include computer device 100, illustrated in FIG. 1. Example computer system 700 may be connected to other computer systems in a LAN, an intranet, an extranet, and/or the Internet. Computer system 700 may operate in the capacity of a server in a client-server network environment. Computer system 700 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 700 may include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which may communicate with each other via a bus 730.

Processing device 702 represents one or more general-purpose processing devices such as a microprocessor, central processing unit, or the like. More particularly, processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 may be configured to execute instructions implementing method 500 of efficient and fast modular division by four and method 600 of efficient and fast modular inversion.

Example computer system 700 may further comprise a network interface device 708, which may be communicatively coupled to a network 720. Example computer system 700 may further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 may include a computer-readable storage medium (or, more specifically, a non-transitory computer-readable storage medium) 728 on which is stored one or more sets of executable instructions 722. In accordance with one or more aspects of the present disclosure, executable instructions 722 may comprise executable instructions implementing method 500 of efficient and fast modular division by four and method 600 of efficient and fast modular inversion.

Executable instructions 722 may also reside, completely or at least partially, within main memory 704 and/or within processing device 702 during execution thereof by example computer system 700, main memory 704 and processing device 702 also constituting computer-readable storage media. Executable instructions 722 may further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: $\{A\}, \{B\}, \{C\}, \{A, B\}, \{A, C\}, \{B, C\}, \{A, B, C\}$. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor comprising:
    a memory device; and
    one or more circuits, communicatively coupled to the memory device, to:
        store a first number in the memory device, wherein the first number represents an input into a modular computational operation;
        store a second number in the memory device;
        select a conditional operation (CO) from a plurality of COs, wherein each of the plurality of COs updates or maintains the second number, wherein a first CO of the plurality of COs is selected contingent upon:
            a subset of bits of the second number and the subset of bits of the first number having a first value, or
            the subset of bits of the second number having a second value and the subset of bits of a third number having the first value, wherein the third number is triple the first number;
        perform the selected CO to update the second number; and
        generate an output of the modular computational operation using the updated second number.

2. The processor of claim 1, wherein a second CO of the plurality of COs is selected contingent upon:
    the subset of bits of the second number and the subset of bits of the third number having the second value, or
    the subset of bits of the second number having the first value and the subset of bits of the first number having the second value.

3. The processor of claim 2, wherein the one or more circuits comprise:
    an adder circuit to update the second number by adding a first operand and a second operand, wherein the first operand comprises the second number; and
    one or more multiplexers to select the second operand, wherein the second operand comprises the third number for the first CO and the first number for the second CO.

4. The processor of claim 2, wherein a third CO of the plurality of COs is selected contingent upon the subset of bits of the second number having a third value and comprises updating the second number by adding twice the first number to the second number, and wherein a fourth CO of the plurality of COs is selected based on the subset of bits of the second number having a fourth value and comprises maintaining the second number.

5. The processor of claim 1, wherein the modular computational operation is a division of the second number by four modulo the first number, and wherein to generate the output of the modular computational operation, the one or more circuits are to right-shift the second number by two bits.

6. The processor of claim 1, wherein the modular computational operation is an inverse of the first number modulo a number that is an integer power of two.

7. The processor of claim 6, wherein to compute the output of the modular computational operation, the one or more circuits are to select the CO and to perform the selected CO for each of a plurality of iterations, wherein during each of the plurality of iterations the one or more circuits are to identify a plurality of bits of the output of the modular computational operation.

8. The processor of claim 1, wherein the subset of bits of each of the first number, the second number, and the third number contains two least significant bits of a respective number, wherein the first value is three, and wherein the second value is one.

9. A method of obtaining an output of a modular computational operation, the method comprising:
    storing, by a processing device, a first number in a memory device, wherein the first number represents an input into the modular computational operation;
    storing, by the processing device, a second number in the memory device;
    selecting, by the processing device, a conditional operation (CO) from a plurality of COs, wherein each of the plurality of COs is selected contingent upon a subset of bits of the second number and comprises:
       maintaining the second number, or
       modifying the second number with a multiple of the first number,
    wherein a first CO of the plurality of COs comprises adding, to the second number, a number that is equal to a product of i) the first number and ii) a subset of bits of a third number, wherein the third number is triple the first number;
    performing, by the processing device, the selected CO to update the second number; and
    generating, by the processing device, the output of the modular computational operation using the updated second number.

10. The method of claim 9, wherein the modular computational operation that comprises a division of the second number by four modulo the first number, and wherein generating the output of the modular computational operation comprises right-shifting the second number by two bits.

11. The method of claim 9, wherein the modular computational operation is an inverse of the first number modulo a number that is an integer power of two.

12. The method of claim 11, wherein computing the output of the modular computational operation comprises using multiple iterations of the selecting and the performing, each iteration identifying a plurality of bits of the output of the modular computational operation.

13. The method of claim 9, wherein the first CO is contingent upon the subset of bits of the second number having value of one.

14. The method of claim 9, wherein a second CO of the plurality of COs is contingent upon the subset of bits of the second number having value of two and comprises:
    adding, to the second number, a number that is double the first number.

15. The method of claim 14, wherein a third CO of the plurality of COs is contingent upon the subset of bits of the second number having value of three and comprises:
    adding, to the second number, a number that is equal to a product of i) the first number and ii) a subset of bits of the first number; and
wherein a fourth CO of the plurality of COs is contingent upon the subset of bits of the second number having value of zero and comprises:
    maintaining the second number.

16. The method of claim 9, wherein the subset of bits of the second number contains two least significant bits of the second number, and the subset of bits of the third number contains two least significant bits of the third number.

17. An accelerator circuit comprising:
    a first register to store a first number, wherein the first number represents an input into a modular computational operation;
    a second register to store a second number;
    a third register to store a third number, wherein the third number is triple the first number;
    a decode unit to:
       receive an instruction to perform the modular computational operation, the instruction identifying a first operand stored in the first register, a second operand stored in the second register, and a third operand stored in the third register; and
       select a conditional operation (CO) from a plurality of COs, wherein each of the plurality of COs updates or maintains the second operand, wherein a first CO of the plurality of COs is selected contingent upon:
          a subset of bits of the second operand and the subset of bits of the first operand having a first value, or
          the subset of bits of the second operand having a second value and the subset of bits of a third operand having the first value; and
    an execution unit to:
       perform the selected CO to update the second operand; and
       generate an output of the modular computational operation using the updated second operand.

18. The accelerator circuit of claim 17, wherein a second CO of the plurality of COs is selected contingent upon:
    the subset of bits of the second operand and the subset of bits of the third operand having a second value, or
    the subset of bits of the second operand having a first value and the subset of bits of the first operand having the second value.

19. The accelerator circuit of claim 18, wherein the execution unit comprises:
    an adder circuit to update the second operand by adding the first operand and the second operand; and
wherein the decode unit comprises:
    one or more multiplexers to select the third operand for the first CO and the first operand for the second CO.

20. The accelerator circuit of claim 18, wherein a third CO of the plurality of COs is selected contingent upon the subset of bits of the second operand having a third value and comprises updating the second operand by adding twice the first operand to the second operand, and wherein a fourth CO of the plurality of COs is selected based on the subset of bits of the second number having a fourth value and comprises maintaining the second operand.

\* \* \* \* \*